United States Patent [19]

Bertrams

[11] Patent Number: 4,480,574
[45] Date of Patent: Nov. 6, 1984

[54] BOAT WITH SEISMIC GUN JIB

[76] Inventor: Rainer B. Bertrams, P.O. Box 7646, Houston, Tex. 77270

[21] Appl. No.: 403,574

[22] Filed: Jul. 30, 1982

[51] Int. Cl.$^3$ ............................................. B63B 21/16
[52] U.S. Cl. .................................... 114/254; 114/270; 114/242
[58] Field of Search ............... 114/270, 240 A, 240 B, 114/242, 244, 253, 254, 268, 255; 182/36, 103; 73/170 A

[56] References Cited

U.S. PATENT DOCUMENTS

| | | | |
|---|---|---|---|
| 1,270,544 | 6/1918 | Newsom et al. | 114/240 B |
| 2,291,380 | 7/1942 | Diebert | 114/255 |
| 3,108,246 | 10/1963 | Jones | 114/244 |
| 4,406,242 | 9/1983 | Weeks | 114/242 |

FOREIGN PATENT DOCUMENTS 1231486  5/1971  United Kingdom ................ 114/244

OTHER PUBLICATIONS

Occhiello et al., "Temperature Measurement Array for Internal Wave Observations", *Oceans* 1976 Conference, MTS-IEEE, Sep. 13-15, 1976, Wash., D.C.

*Primary Examiner*—Trygve M. Blix
*Assistant Examiner*—Thomas J. Brahan
*Attorney, Agent, or Firm*—Neal J. Mosely

[57] ABSTRACT

A ship is disclosed for seismic or geophysical exploration. The ship is provided with a pair of jibs which are supported between upper and lower decks for pivotal movement between a retracted position between the decks and an outwardly pivoted position extending laterally outward from the sides thereof. The jibs are each of a reinforced construction of triangular cross-section. A plurality of motor-driven reels are positioned at intervals along the length of each jib for reeling out and in a cable supporting a seismic exploration gun or other geophysical exploration device. A trolley mechanism is supported for movement longitudinally of each jib to carry seismic guns to and from the point of connection to the respective cables. Each jib includes a catwalk to permit access to the operating parts thereof during use.

18 Claims, 4 Drawing Figures

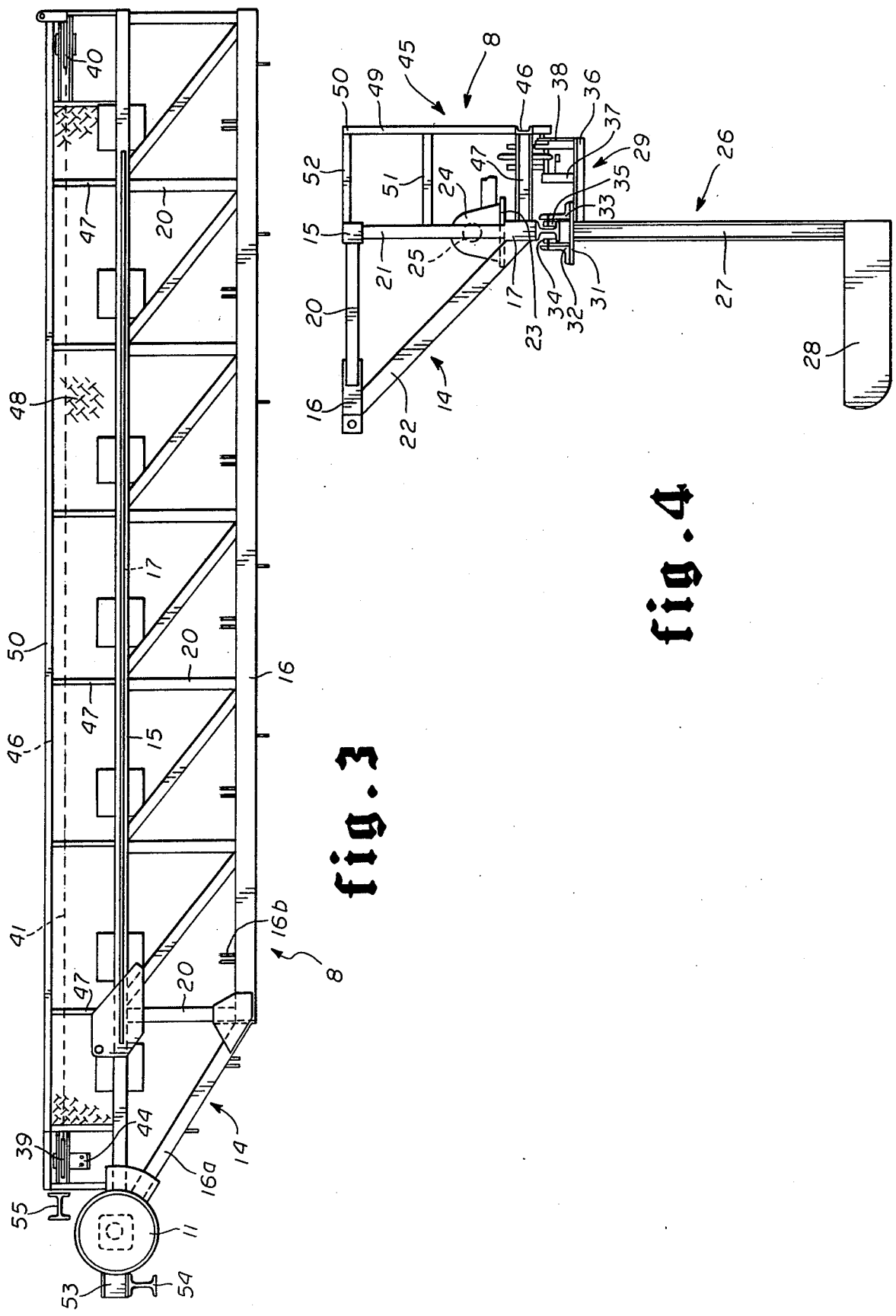

4,480,574

BOAT WITH SEISMIC GUN JIB

BACKGROUND OF THE INVENTION

1. Field of the Invention

This invention relates to new and useful improvements in ships for geophysical exploration and to accessory equipment for such ships.

2. Description of the Prior Art

In exploring for oil and gas under bodies of water, it has been customary to trail a number of seismic guns at intervals along a cable extended behind a seismic exploration ship. The positioning of the seismic guns in series relation along the supporting cable has presented the difficulty that, when one of the guns requires service, all of the guns must be reeled in. A short time ago, a seismic exploration ship was equipped with the seismic guns supported on parallel lines. This arrangement, however, had substantial problems in servicing the individual lines on which the guns were to be supported.

In the art of fishing, there have been a number of examples multiple fishing lines supported from swinging or pivotted jibs.

Dibert U.S. Pat. No. 2,291,380 discloses a fishing craft having swinging booms which pivot from opposite sides and support a plurality of seats for fishermen.

Ursich U.S. Pat. No. 2,488,451 discloses a fishing craft with booms which swing outward and support a plurality of fishing lines.

Lyons U.S. Pat. No. 3,355,835 discloses a fishing craft which has outwardly extending jig poles which support guides for fishing lines which are fed from a bank of separate fishing reels.

The apparatus shown in these patents, however, was not designed for handling seismic guns and has not had the accessory equipment needed for that purpose.

SUMMARY OF THE INVENTION

One of the objects of this invention is to provide a new and improved retractable jib assembly for geophysical exploration ships.

Another object of the invention is to provide a new and improved retractable jib assembly for geophysical exploration ships which provides for reeling a plurality of cables for geophysical exploration devices in parallel.

Another object of the invention is to provide a new and improved retractable jib assembly for geophysical exploration ships in which the jibs are pivotted between a retracted position between the ship's decks and an extended position extending laterally outward.

Still another object of the invention is to provide a new and improved retractable jib assembly for geophysical exploration ships having individually controlled reels for reeling parallel cables for geophysical exploration devices.

Still another object of the invention is to provide a new and improved retractable jib assembly for geophysical exploraton ships having a trolley assembly for servicing separate cables for geophysical exploration devices during use.

Yet another object of the invention is to provide a new and improved retractable jib assembly for geophysical exploration ships having individually controlled reels for reeling parallel cables for geophysical exploration devices, a trolley assembly for servicing separate cables for geophysical exploration devices during use, and a catwalk for access by workers during use.

Other objects of the invention will become apparent throughout the specification and claims as hereinafter related.

The above noted objects of the invention and other objects are obtained by a ship constructed for seismic exploration having a novel jib assembly for seismic guns or similar geophysical exploration devices. The ship is provided with a pair of jibs which are supported between upper and lower decks for pivotal movement between a retracted position between the decks and an outwardly pivotted position extending laterally outward from the sides thereof. The jibs are each of a reinforced construction of triangular cross-section. A plurality of motor-driven reels are positioned at intervals along the length of each jib for reeling out and in a cable supporting a seismic exploration gun. A trolley mechanism is supported for movement longitudinally of each jib to carry seismic guns to and from the point of connection the respective cables. Each jib includes a catwalk to permit access to the operating parts thereof during use.

BRIEF DESCRIPTION OF THE DRAWINGS

FIG. 3 is a top plan view of the jib of FIG. 2.

FIG. 4 is a view in end elevation of the jib shown in FIGS. 2 and 3 and including details of the trolley and support for the seismic guns or other geophysical equipment.

DESCRIPTION OF THE PREFERRED EMBODIMENT

Figure 1:
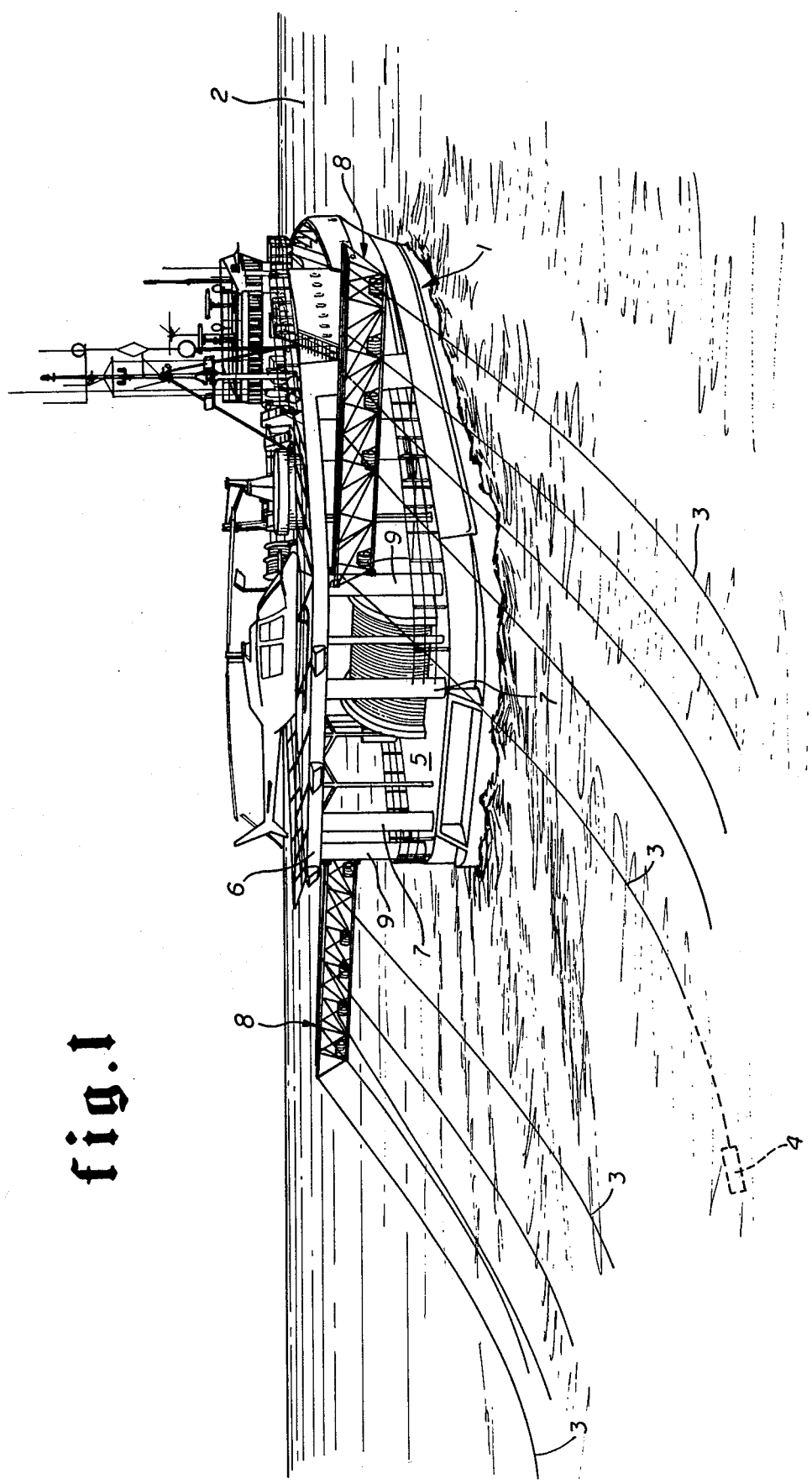
FIG. 1 is an isometric view of a geophysical exploration ship equipped with retractable jibs for releasing the geophysical exploration equipment lines in parallel.

Referring to the drawings by numerals of reference, and more particularly to FIG. 1, there is shown ship 1 which is used for seismic or other geophysical exploration. Ship 1 is shown on a body of water 2 where it is undertaking a voyage of exploration for oil and gas deposits. The ship is arranged to trail a number of geophysical exploration devices behind it which assist in exploring for oil and gas deposits. The geophysical exploration device is usually a seismic gun which fires explosure charges to produce shock waves which are recorded by seismic or other recording equipment carried on the ship.

As is well known in the art of seismic exploration, the seismic wave patterns provide a basis for evaluation of geological structures underlying the area being explored. A plurality of seismic guns (or other geophysical exploration devices) are used at selected intervals to produce a corresponding number of separate shock waves, or other signals, which are recorded on the geophysical exploration equipment recording devices.

In the past, the separate seismic guns have been trailed at selected intervals on a single line trailing behind the geophysical exploration vehicle. As noted above, this arrangement has had the disadvantage that it is necessary to pull in all of the seismic guns to service or replace a single one of them. In this invention, there are a plurality of separate lines 3 which support seismic guns 4 in parallel relation. The trailing lines 3 may be reeled in separately when servicing or replacing individual seismic guns (or other geophysical exploration devices).

The ship 1 is shown in some detail but will not be described in detail since only the structure relating to the handling of the seismic guns or other geophysical exploration devices is relevant to the invention. Ship 1 is constructed with a main lower deck 5 and an upper deck 6. The upper and lower decks are supported by masts or posts 7 in spaced relation. Lower deck 5 and upper deck 6 are substantially open on the sides and rear.

Ship 1 is provided with a pair of pivoted, retractable jibs 8 which are supported on masts 9 extending between decks 5 and 6. The open space on each side of the ship between decks 5 and 6 is a of length permitting complete pivotal retraction of jibs 8. The details of the cable-handling jibs 8 are set forth in FIGS. 2–4, described below.

Figure 2:
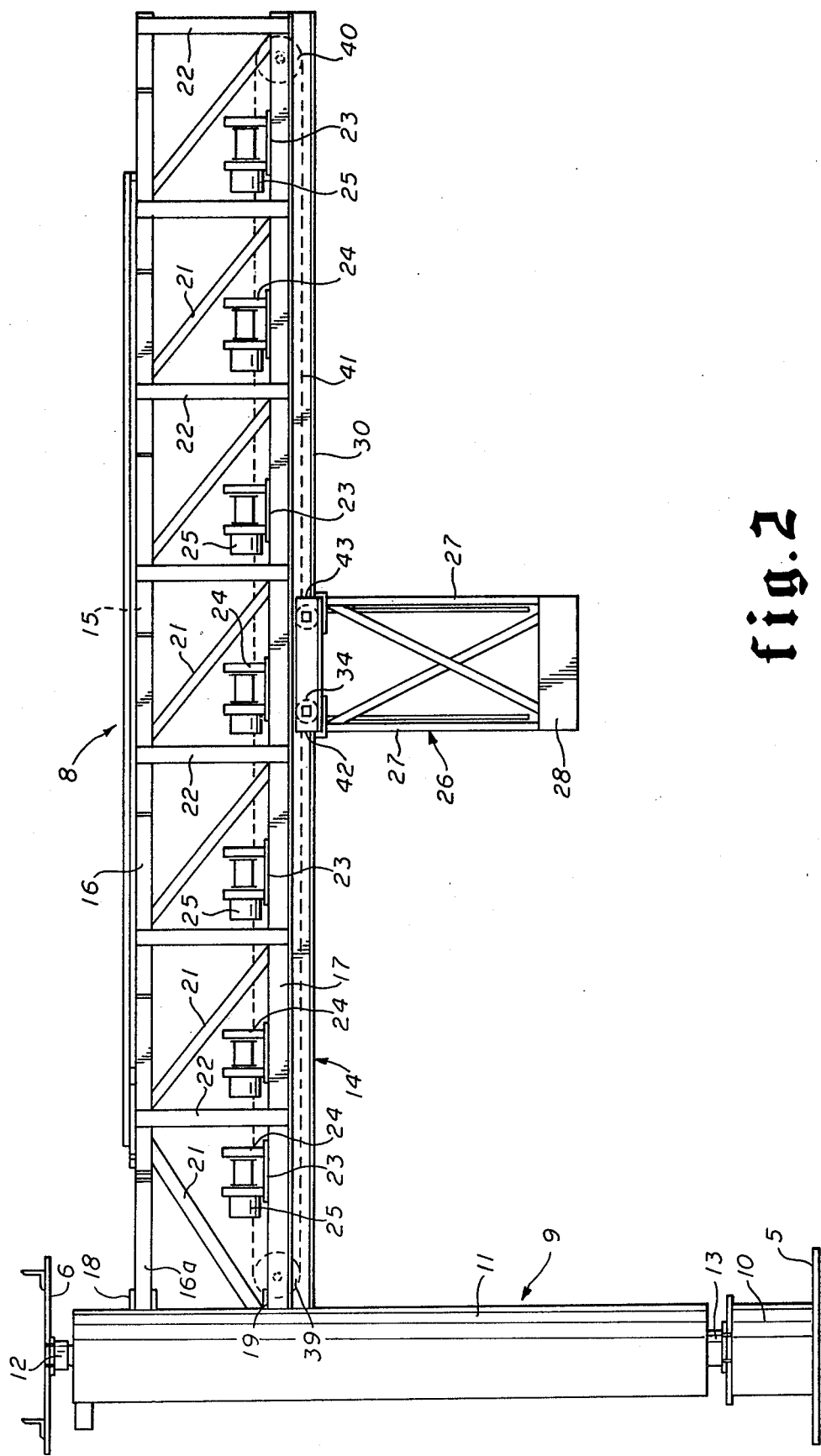
FIG. 2 is a view in side elevation of one of the jibs showing details of construction and of assembly on the ship.

Referring to FIG. 2, it is seen that mast 9, which supports jib 8, comprises a base portion 10 resting on lower deck 5 and a main mast portion 11 which has a top pivotal support or bearing 12 on the underside of upper deck 6. The main mast portion 11 also has a pivotal support or bearing 13 at its lower end providing a pivotal connection to the base portion 10.

Jib 8 comprises a truss assembly 14 extending laterally outward from mast assembly 9. Truss assembly 14 of jib 8 is constructed of tubular beams, I-beams, H-beams, or the like, and is of a welded construction. Truss assembly 14 comprises a pair of beams 15 and 16 which extend in substantially parallel relation and lie in substantially a horizontal plane in normal installation and use. A plurality of guide sheaves 16a are supported on beam 16 to guide lines 3 to the reels 25. A third beam 17 extends parallel to beam 15 and lies directly below it in a vertical plane. Beams 15 and 17 lie in a vertical plane and extend at their innermost ends to supporting brackets 18 and 19 on mast member 11. Beam 16 has an end portion 16a which extends at an angle for connection to supporting brackets 18 which also supports beam 15.

The truss assembly 14 is therefore supported by brackets 18 and 19 on mast member 11 of mast assembly 9 and is pivotally movable by pivotal or rotary movement of mast member 11 on the pivotal supports 12 and 13. Beams 15 and 16 are supported in spaced relation by laterally extending braces 20 which are welded thereto. Beams 15 and 17 are supported in spaced relation parallel relation by angularly extending braces 21. Beams 16 and 17 are supported in parallel relation by braces 22. The several braces for the beams 15, 16, and 17 are welded in place and form a rigid truss assembly 14.

Truss assembly 14 is provided with a plurality of supporting plates 23 which are secured on beam 17 and support reels 24 on which the separate cables 3 are wound and unwound for trailing seismic guns 4. Each of the reels 24 is provided with a separately operated motor 25. The reel motor 25 may be driven by any conventional means. Motors 25 are preferably hydraulic motors, although pneumatic motors or electrical motors could be used.

Seismic gun jib 8 is provided with a gun trolley assembly 26 which consists of a framework comprising a plurality of channel-shaped members or the like 27 which are welded together to provide a rigid construction. The framework comprising channel members 27 supports a seismic support member or carriage 28 at its lower end. Gun support or carriage 28 is a half cylinder or trough-shaped member. At the upper end of trolley assembly 26, there is provided a supporting structure 29 which includes the trolley mechanism.

Beam 17 of truss assembly 14 has an I-beam 30 secured thereto and extending longitudinally along the entire length thereof. Supporting structure 29 at the upper end of trolley assembly 76 is constructed to be supported on I-beam 30 as a track for movement of the trolley along the length of the seismic gun jibs.

Supporting structure 29 includes a flat plate member 31 welded to the upper end of the frame members 27 of trolley assembly 26. A pair of angle irons 32 and 33 are welded to plates 31 and support a plurality of rollers 34 on one side and rollers 35 on the other side. Rollers 34 and 35 ride on the lower flange of I-beam 30 and are operable to support trolley assembly 26 for longitudinal movement along I-beam 30 for the entire length of seismic gun jib 8.

Trolley assembly 26 is therefore capable of longitudinal movement from the inner end of I-beam 30 adjacent to mast assembly 9 to the outer, unsupported end of the seismic gun jib. Trolley assembly 26 can therefore move along the entire length of seismic gun jib 8 to carry a seismic gun during the loading or unloading of the guns to from the cables carried on reels 24. Supporting structure 29 at the top of trolley mechanism 26 includes a supporting plate 36 which supports upward the extending members 37 and 38 which are arranged for connection to the chain-drive mechanism which moves the trolley mechanism along supporting I-beam 30.

The trolley mechanism 26 is operated along the length of seismic gun jib 8 by a chain-drive mechanism comprising a drive sprocket 39 at one end and an idler sprocket 40 at the other end and chain 41 extending around the sprockets 39 and 40. Drive chain 41 is connected at 42 to one side of trolley supporting mechanism 29 and is connected at 43 to the other side of the trolley supporting mechanism. Rotation of drive sprocket 39 is therefore effective to move trolley mechanism 26 along the supporting I-beam 30. Drive sprocket 39 is driven by motor 44.

Seismic gun jib 8 is also provided with a catwalk assembly 45 which extends along one side of the supporting truss assembly 44 to permit access to various reels 24 and to other points for service and for normal operation of the assembly. Catwalk assembly 45 comprises beam 46 which extends parallel to beam 17 and is welded to a plurality of braces 47 spaced along the length of the beam. The structure is welded together and provides a rigid support for a platform 48 which is preferably a expanded metal lattice or the like. A plurality of upright posts 49 support an upper handrail 50. Handrail 50 and the end vertical support 49 are secured on vertical brace 21 by braces 51 and 52. This catwalk assembly permits an individual worker to move along platform 48 with the security of handrail 50 and permits access to the individual cable reels 23 and the other parts of the apparatus for servicing.

In FIG. 3, the plan view of seismic gun jib 8 is actually shown in the retracted position on the boat. The main pivoted mast member 11 has a stop 53 secured thereon and movable therewith. Stop member 53 is preferably of a short section of an H-beam welded to mast assembly portion 11. Stop member 53 moves with the rotation of mast portion 11 between fixed stops 54 and 55 on the ship. Thus, when seismic gun jib 8 is swung outward by clockwise rotation, as viewed in FIG. 3, stop member 53 will engage fixed stop 55 and limit the pivotal movement of jib 8 to 90°. Likewise, when the gun jib 8 is moved to the retracted position, as seen in FIG. 3, fixed stop 54 is engaged by stop member 53 which prevents further inward rotation of the gun jib.

OPERATION

While the operation of this apparatus should be more or less apparent from the description of its components and assembly, a more detailed description of operation will be given to facilitate a thorough understanding of the invention.

The seismic gun jib 8 is mounted on ship 1 at the shipyard. Mast assembly 9 is positioned between the upper and lower decks of the ship, as shown in FIGS. 1 and 2, and may be moved or pivoted between a retracted position between the decks and an extended position extending at 90° from the side of the ship on each side. The gun jib assembly 8 may be serviced either in the retracted or in the extended positions.

When the gun cables are reeled in the seismic guns 4 are fastened to the end of the individual cables 3 and the apparatus is ready for use. The gun jibs are swung outward and extend from opposite sides of the ship as seen in FIG. 1. The reel motors 35 are operated to reel out the cable and the individual cables 3 and the seismic guns 4 are lowered into the water and trailed behind the ship, as seen in FIG. 1. The reel motors 25 may be operated to unreel the cables 3 to extend the seismic guns 4 to a substantial distance behind the ship 1.

Seismic guns 4 are fired in a conventional manner to provide shock waves at spaced intervals, determined by the lateral spacing of the supporting cables 3, as well as a longitudinal spacing based on the length of cable unreeled for any given seismic gun. The shock waves from the seismic guns go through the formation on the bed of the body of water being surveyed by the ship and the reflected seismic waves are recorded and the data analyzed by the seismic recording equipment carried by the ship.

The individual cable reels 24 are separately controlled by the respective motors 25 which may be operated to adjust the amount of cable released to determine the distance any selected seismic gun is allowed to extend behind the ship. When the guns need to be serviced or replaced during operation, individual reels may be operated by their respective motors to reel in the cable and bring the seismic gun to a proper position for service or for removal and replacement. A serviceman or operator can walk along catwalk 45 to a given position along the length of jib 8 for servicing or adjusting equipment.

Trolley assembly 26 is movable by motor 44 and drive chain 41 along the length of I-beam 30. Trolley assembly 26 can be moved to a position adjacent to any selected reel so that the supporting carriage or trough 28 may be positioned to pick up a seismic gun which is to be recovered. The seismic gun can be removed from the end of the cable and the trolley assembly 26 moved along supporting rails or I-beam 30 to the ship for replacement or service. Likewise, a new or freshly serviced seismic gun can be placed in the carriage or trough 28 and moved by trolley assembly 26 to any selected cable reel for installation of the seismic gun at that point.

While this invention has been described fully and completely with special emphasis upon a single preferred embodiment, it should understood that within the scope of the appended claims the the invention may be practiced otherwise than as specifically described herein.

I claim:

1. A marine oil and gas geophysical exploration apparatus comprising in combination
    a ship having upper and lower, spaced decks with longitudinally extending openings along the sides of the rear portion thereof,
    a pair of jibs supported between said decks at the rear of said ship and pivotally movable between a first position between said decks and a second position extending laterally outward from each side of said ship,
    a plurality of reels of cable supported along the length of each jib for releasing the cables in parallel relation,
    motor means for separately rotating said reels,
    an oil and gas geophysical exploration device removably supported on the end of each cable, and
    means comprising a trolley supported beneath each jib for movement longitudinally thereof for moving a geophysical exploration device longitudinally along each jib to a position aligned with each of said reels for removing or installing said geophysical exploration devices from or on the ends of said cables.

2. A marine oil and gas geophysical exploration apparatus according to claim 1, in which
    said geophysical exploration devices comprise seismic guns.

3. A marine oil and gas geophysical exploration apparatus according to claim 1 or 2, in which
    said motor means comprises separate motors for each of said reels.

4. A marine oil and gas geophysical exploration apparatus according to claim 1, in which
    each of said jibs comprises a mast extending vertically between said decks and supported for pivotal movement, and a supporting truss extending laterally therefrom,
    said truss supporting said cable reels, said motor means, and said geophysical exploration device moving means, and being pivotally movable on said mast from said first position to said second position.

5. A marine oil and gas geophysical exploration apparatus according to claim 4, in which
    each of said geophysical exploration device moving means comprises a trolley supported beneath the respective trusses of said jibs.

6. A marine oil and gas geophysical exploration apparatus according to claim 4, in which
    each truss includes a horizontal longitudinally extending catwalk supported beside the truss and positioned for access to said cable reels for servicing said geophysical exploration devices.

7. A marine oil and gas geophysical exploration apparatus comprising in combination
    a ship having upper and lower, spaced decks with longitudinally extending openings along the sides of the rear portion thereof,
    a pair of jibs supported between said decks at the rear of said ship, each comprising a mast extending vertically between said decks supported for pivotal movement, and a supporting truss extending laterally therefrom, each truss being pivotally movable on its mast between a first position between said decks and a second position extending laterally outward from each side of said ship, each of said trusses comprising a pair of beams longitudinally extending in parallel relation in a horizontal plane, a third beam extending substantially parallel to and below said pair of beams, and a plurality of laterally extending braces interconnecting and bracing said beams, a plurality of reels of cable supported in longitudinally spaced relation on each truss for releasing the cables in parallel relation, a plurality of motors supported on each truss for separately rotating said reels, an oil and gas geophysical exploration device removably supported on the end of each cable, and a trolley supported for movement along said third beam and having a supporting member for supporting and moving a geophysical exploration device longitudinally of the jib to a position aligned with each of said reels for removing or installing said geophysical exploration devices from or on the ends of said cables.

8. A marine oil and gas geophysical exploration apparatus according to claim 7, in which
each truss includes a horizontal longitudinally extending catwalk supported beside said third beam and positioned for access to said cable reels for servicing said geophysical exploration devices.

9. A marine oil and gas geophysical exploration apparatus according to claim 7 or 8, in which
said geophysical exploration devices comprise seismic guns.

10. An apparatus for marine oil and gas exploration for use in combination with a ship having upper and lower, spaced decks with longitudinally extending openings along the sides of the rear portion thereof,
said apparatus comprising
a pair of jibs adapted to be supported between the decks at the rear of the ship for pivotal movement between a first position between said decks and a second position extending laterally outward from each side of said ship, a plurality of reels of cable supported along the length of each jib adapted to release the cables in parallel relation, motor means for separately rotating said reels, an oil and gas geophysical exploration device removably supported on the end of each cable, and means coprising a trolley supported beneath each jib for movement longitudinally thereof for moving a geophysical exploration device longitudinally along each jib to a position aligned with each of said reels for removing or installing said geophysical exploration devices from or on the end of said cables.

11. An apparatus according to claim 10, in which
said geophysical exploration devices comprise seismic guns.

12. An apparatus according to claim 10 or 11, in which
said motor means comprises separate motors for each of said reels.

13. An apparatus according to claim 10, in which
each of said jibs comprises a mast adapted to be supported vertically between said decks for pivotal movement, and a supporting truss extending laterally therefrom, said truss supporting said cable reels, said motor means, and said geophysical exploration device moving means, and being pivotally movable on said mast from said first position to said second position.

14. An apparatus according to claim 13, in which
each of said geophysical exploration device moving means comprises a trolley supported beneath the respective trusses of said jibs.

15. An apparatus according to claim 13, in which
each truss includes a horizontal longitudinally extending catwalk supported beside the truss and positioned for access to said cable reels for servicing said geophysical exploration devices.

16. An apparatus for marine oil and gas exploration for use in combination with a ship having upper and lower, spaced decks with longitudinally extending openings along the sides of the rear portion thereof,
said apparatus comprising
a pair of jibs adapted to be supported between said decks at the rear of said ship, each comprising a mast adapted to extend vertically between said decks and be supported for pivotal movement, and a supporting truss extending laterally therefrom, each truss being adapted for pivotal movement on its mast between a first position between said decks and a second position extending laterally outward from each side of said ship, each of said trusses comprising a pair of beams longitudinally extending in parallel relation in a horizontal plane, a third beam extending substantially parallel to and below said pair of beams, and a plurality of laterally extending braces interconnecting and bracing said beams, a plurality of reels of cable supported in longitudinally spaced relation on each truss for releasing the cables in parallel relation, a plurality of motors supported on each truss for separately rotating said reels, an oil and gas geophysical exploration device removably supported on the end of each cable, and a trolley supported for movement along said third beam and having a supporting member for supporting and moving an geophysical exploration device longitudinally of the jib to a position aligned with each of said reels for removing or installing said geophysical exploration devices from or on the ends of said cables.

17. A marine oil and gas geophysical exploration apparatus according to claim 16, in which
each truss includes a horizontal longitudinally extending catwalk supported beside said third beam and positioned for access to said cable reels for servicing said geophysical exploration devices.

18. A marine oil and gas geophysical exploration apparatus according to claim 16 or 17, in which
said geophysical exploration devices comprise seismic guns.

* * * * *